(12) United States Patent
Wolfe (10) Patent No.: US 7,996,595 B2
(45) Date of Patent: Aug. 9, 2011

(54) INTERRUPT ARBITRATION FOR MULTIPROCESSORS

(75) Inventor: Andrew Wolfe, Los Gatos, CA (US)

(73) Assignee: Lstar Technologies LLC, Wilmington, DE (US)

( * ) Notice: Subject to any disclaimer, the term of this patent is extended or adjusted under 35 U.S.C. 154(b) by 0 days.

(21) Appl. No.: 12/423,368

(22) Filed: Apr. 14, 2009

(65) Prior Publication Data

US 2010/0262742 A1    Oct. 14, 2010

(51) Int. Cl.
G06F 13/26 (2006.01)
G06F 13/24 (2006.01)
G06F 13/32 (2006.01)

(52) U.S. Cl. ........ 710/265; 710/262; 710/264; 710/267; 710/268; 710/269

(58) Field of Classification Search ........... 710/260–269
See application file for complete search history.

(56) References Cited

U.S. PATENT DOCUMENTS

| | | | | | |
|---|---|---|---|---|---|
| 4,047,161 | A | * | 9/1977 | Davis | 718/108 |
| 4,482,954 | A | * | 11/1984 | Vrielink et al. | 710/268 |
| 4,779,194 | A | * | 10/1988 | Jennings et al. | 718/106 |
| 4,964,040 | A | * | 10/1990 | Wilcox | 710/3 |
| 5,179,707 | A | * | 1/1993 | Piepho | 710/260 |
| 5,283,904 | A | * | 2/1994 | Carson et al. | 710/266 |
| 5,313,584 | A | * | 5/1994 | Tickner et al. | 710/37 |
| 5,379,428 | A | * | 1/1995 | Belo | 718/103 |
| 5,410,710 | A | * | 4/1995 | Sarangdhar et al. | 710/266 |
| 5,452,452 | A | * | 9/1995 | Gaetner et al. | 718/103 |
| 5,564,060 | A | * | 10/1996 | Mahalingaiah et al. | 710/51 |
| 5,613,128 | A | * | 3/1997 | Nizar et al. | 710/266 |
| 5,646,676 | A | * | 7/1997 | Dewkett et al. | 725/92 |
| 5,889,978 | A | * | 3/1999 | Jayakumar | 703/27 |
| 5,918,057 | A | * | 6/1999 | Chou et al. | 710/260 |
| 5,944,809 | A | * | 8/1999 | Olarig et al. | 710/260 |
| 6,148,361 | A | * | 11/2000 | Carpenter et al. | 710/260 |
| 6,205,508 | B1 | * | 3/2001 | Bailey et al. | 710/260 |
| 6,418,497 | B1 | * | 7/2002 | Guthrie et al. | 710/264 |

(Continued)

FOREIGN PATENT DOCUMENTS

EP   0 602 858 A1   6/1994

(Continued)

OTHER PUBLICATIONS

Gountanis et al., "A method of processor selection for interrupt handling in a multiprocessor system", Dec. 1966, IEEE, Proceedings of the IEEE, vol. 54, No. 12, pp. 1812-1819.*

(Continued)

*Primary Examiner* — Faisal M Zaman
(74) *Attorney, Agent, or Firm* — Hope Baldauff Hartman, LLC (57) ABSTRACT

Technologies are generally described herein for handling interrupts within a multiprocessor computing system. Upon receiving an interrupt at the multiprocessor computing system, a priority level associated with an interrupt handler for the interrupt can be determined. Current task priority levels can be queried from one or more processors of the multiprocessor computing system. One of the processors can be assigned to execute the interrupt handler in response to the processor having a lowest current task priority level. Interrupt arbitration can schedule and communicate interrupt responses among processor cores in a multiprocessor computing system. Arbitration can query information about current task or thread priorities from a set of processor cores upon receiving an interrupt. The processor core that is currently idle or running the lowest priority task may be selected to service the interrupt.

17 Claims, 6 Drawing Sheets

U.S. PATENT DOCUMENTS

| | | | |
|---|---|---|---|
| 6,779,065 B2 | 8/2004 | Murty et al. | |
| 6,983,339 B1 * | 1/2006 | Rabe et al. | 710/260 |
| 6,996,745 B1 * | 2/2006 | Shaylor | 714/24 |
| 7,003,611 B2 * | 2/2006 | Arndt | 710/260 |
| 7,039,740 B2 * | 5/2006 | Glasco et al. | 710/266 |
| 7,191,349 B2 * | 3/2007 | Kaushik et al. | 713/323 |
| 7,197,627 B1 * | 3/2007 | Naylor | 712/34 |
| 7,350,005 B2 * | 3/2008 | Yiu et al. | 710/264 |
| 7,386,002 B2 * | 6/2008 | Meier | 370/449 |
| 7,581,052 B1 * | 8/2009 | Solomita | 710/267 |
| 7,685,347 B2 * | 3/2010 | Gibbs | 710/264 |
| 7,809,876 B2 * | 10/2010 | Balasubramanian | 710/263 |
| 7,899,966 B2 * | 3/2011 | Kulkarni | 710/267 |
| 2002/0062381 A1 * | 5/2002 | Gargiulo et al. | 709/228 |
| 2002/0087775 A1 * | 7/2002 | Looi et al. | 710/260 |
| 2003/0101301 A1 * | 5/2003 | Taniguchi | 710/260 |
| 2005/0010707 A1 | 1/2005 | Francis | |
| 2006/0026322 A1 | 2/2006 | Chauvel et al. | |
| 2006/0200826 A1 * | 9/2006 | Tamura et al. | 718/103 |
| 2007/0256076 A1 * | 11/2007 | Thompson et al. | 718/102 |
| 2008/0140896 A1 * | 6/2008 | Todoroki et al. | 710/264 |
| 2009/0204932 A1 * | 8/2009 | Bormann et al. | 716/5 |
| 2009/0248934 A1 * | 10/2009 | Ge et al. | 710/261 |
| 2009/0327556 A1 * | 12/2009 | Railing et al. | 710/267 |
| 2010/0274879 A1 | 10/2010 | Wolfe | |
| 2010/0274941 A1 | 10/2010 | Wolfe | |

FOREIGN PATENT DOCUMENTS

| | | | |
|---|---|---|---|
| EP | 0 685 798 A2 | | 12/1995 |
| EP | 685798 A2 * | | 12/1995 |
| EP | 827084 A2 * | | 3/1998 |
| EP | 2241979 A1 * | | 10/2010 |
| JP | 2000029719 A * | | 1/2000 |
| JP | 2001290660 A * | | 10/2001 |
| WO | WO 95/18416 A1 | | 7/1995 |

OTHER PUBLICATIONS

Jeffay et al., "Accounting for interrupt handling costs in dynamic priority task systems", Dec. 1-3, 1993, IEEE, Proceedings of the Real-Time Systems Symposium, pp. 212-221.*

Qu et al., "Design and implementation of RTU based on the embedded operation system µC/OS-II", Apr. 5-8, 2004, IEEE, Proceedings of the 2004 IEEE International Conference on Electric Utility Deregulation, Restructuring and Power Technologies, vol. 2, pp. 623-626.*

Manner, Reinhard, "Hardware Task/Processor Scheduling in a Polyprocessor Environment", Jul. 1984, IEEE, IEEE Transactions on Computers, vol. C-33, No. 7, pp. 626-636.*

Intel, "Protection," Intel® 64 and IA-32 Architectures Software Developer's Manual, vol. 3A, System Programming Guide, Part1, Chapter 5, Sep. 2009, 50 pages.

Intel, Intel® 64 Architecture x2APIC Specification, Sep. 2007, 39 pages.

Intel, Intel® 64 Architecture x2APIC Specification, Jun. 2008, 49 pages.

European Search Report dated Jul. 2, 2010 in EP Serial No. 10154704.0.

U.S. Official Action dated Jan. 21, 2011 in U.S. Appl. No. 12/578,270.

* cited by examiner

INTERRUPT ARBITRATION FOR MULTIPROCESSORS

BACKGROUND

Interrupts can signal a computing system of an event to be serviced by the execution of an interrupt handler, which may also be known as an interrupt service routine (ISR). Such a signal event can be referred to as an interrupt request (IRQ). A processor can undergo a context switch to transition from its current task to execute the interrupt handler associated with a received interrupt. A transition from the current processor task can be considered an interruption of the current task. Allocating a received interrupt to a particular processor or processor core for execution within a multiprocessor computing system can present additional complications. It is with respect to these considerations and others that the disclosure made herein is presented.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The following disclosure is drawn, inter alia, to methods, apparatus, systems and computer program products related to technologies for allocating an interrupt to a specific processor core within a multiprocessor. Through the use of the technologies and concepts presented herein, interrupt arbitration can schedule and communicate interrupt responses among processor cores in a multiprocessor computing system. Arbitration can query information about current task or thread priorities from a set of processor cores upon receiving an interrupt. The processor core that is currently idle or running the lowest priority task may be selected to service the interrupt. Referring now to the drawings, in which like numerals represent like elements through the several figures, aspects of interrupt optimization within multiprocessor systems are described.

Technologies are generally described herein for handling interrupts within a multiprocessor computing system. Upon receiving an interrupt at the multiprocessor computing system, a priority level associated with an interrupt handler for the interrupt can be determined. Current task priority levels can be queried from one or more processors of the multiprocessor computing system. One of the processors can be assigned to execute the interrupt handler in response to the processor having a lowest current task priority level.

Interrupt arbitration can schedule and communicate interrupt responses among processor cores in a multiprocessor computing system. Arbitration can query information about current task or thread priorities from a set of processor cores upon receiving an interrupt. The processor core that is currently idle or running the lowest priority task may be selected to service the interrupt.

Figure 1:
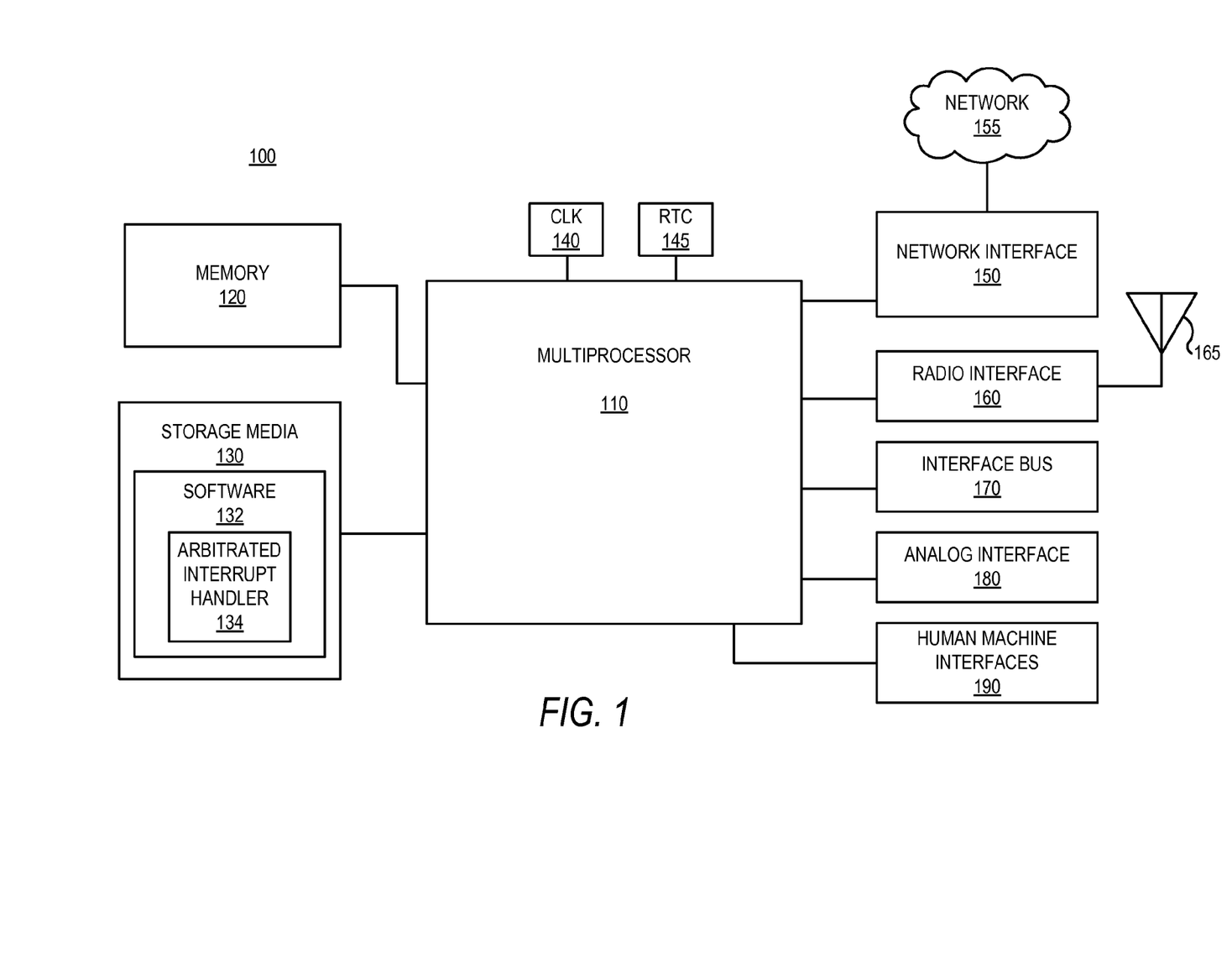
FIG. 1 is a block diagram illustrating an operating environment for a multiprocessor.

Turning now to FIG. 1, a functional block diagram 100 illustrates an operating environment for a multiprocessor 110 according to embodiments presented herein. A multiprocessor 110 can incorporate multiple processors or processor cores. The multiple cores can generally support parallel processing, parallel tasks, parallel threads, separate sequential processes, or any combination thereof. A memory 120 may be accessed by the multiprocessor 110. The multiprocessor 110 may read from and write to the memory 120. Such reads and writes may relate to both instructions and data associated with operations of the multiple cores of the multiprocessor 110. Generally, each of the processor cores within the multiprocessor 110 may individually access the memory 120. The memory 120 may be random access memory (RAM), static RAM (SRAM), dynamic RAM (DRAM), synchronous DRAM (SDRAM), or any type of volatile or non-volatile memory.

Instructions and data associated with operations on the multiple cores of the multiprocessor 110 may be stored on a storage media 130 device or devices. The storage media 130 may support the nonvolatile storage of information. The storage media 130 may be accessed by the multiple processor cores within the multiprocessor 110. The storage media 130 can store software 132 for execution on the multiple processor cores within the multiprocessor 110. By way of example, and not limitation, computer-readable media may comprise computer storage media and communication media. Computer storage media may include volatile, non-volatile, removable, and non-removable media implemented in any method or technology for the storage of information such as computer-readable instructions, data structures, program modules, or other data. Computer storage media may include, but is not limited to, RAM, read only memory (ROM), erasable programmable ROM (EPROM), electronically erasable programmable ROM (EEPROM), flash memory, other solid state memory technology, compact disc ROM (CD-ROM), digital versatile disc (DVD), high definition DVD (HD-DVD), BLU-RAY, other optical storage, magnetic cassettes, magnetic tape, magnetic disk storage, other magnetic storage devices, or any other medium which can be used to store the desired information and which can be accessed by the multiprocessor 110.

Software 132, or other instructions, code, modules, or programs associated with the multiprocessor 110 may include modules for responding to interrupt events. Such a module may be referred to as an interrupt service routine (ISR) or an arbitrated interrupt handler 134. The arbitrated interrupt handler 134 may be associated with a specific interrupt event, a specific cause of interrupt, source of interrupt, or a specific interrupt signal line. The arbitrated interrupt handler 134 may be executed in response to receiving the associated interrupt at the multiprocessor 110. The arbitrated interrupt handler 134 may interrupt, or preempt, other operations associated with the multiprocessor 110. Such preemption may support executing the arbitrated interrupt handler 134 in rapid response to the arrival of an interrupt at the multiprocessor 110. Rapid response can support real-time, hard-real-time, soft-real-time, or near-real-time operation of various software modules. One example of an arbitrated interrupt handler 134 module may be associated with a device driver, or other software, firmware, or modules associated with supporting external devices. In addition to external devices, such modules may support internal circuit blocks that provide interrupts. The supported device, or an associated interface circuit, may be considered a source of an interrupt associated with the device driver, ISR, or arbitrated interrupt handler 134. Upon receiving an interrupt signal, the associated arbitrated interrupt hander 134 may be executed immediately, within a specific time limit, or according to a priority level associated with the arbitrated interrupt handler 134 and other operations.

An external clock 140 can provide a clock signal to the multiprocessor 110. The external clock 140 may include a crystal oscillator or any other clock or oscillator source. The external clock 140 may include a clock driver circuit. The clock signal associated with the external clock 140 may be used to time and synchronize various circuits within the multiprocessor 110. The multiprocessor 110 may also interface to a real time clock (RTC) 145. The real time clock 145 can be used for maintaining human time, such as time of day, day of week, calendar date, year, and so forth. An RTC 145 may generate interrupt events to the multiprocessor 110 related to timers, alarms, or watchdog circuits.

Various devices that interface to the multiprocessor 110 can generate interrupts. Such interrupts can signal to the multiprocessor 110 that service is requested in response to the interrupt. An interrupt handler 134 may be executed to service the interrupt for the device. As non-limiting examples, several different devices are illustrated in FIG. 1. For example an interrupting device may be a network interface 150. The network interface 150 can be used to attach to a network 155. The network interface 150 may generate an interrupt when a data packet is received from the network 155. An arbitrated interrupt handler 134 associated with the network interface 150 may then be executed to receive the data packet from the network interface 150. Similarly, a radio interface 160 may use an antenna 165 to send and receive wireless data packets to a wireless network or a mobile communications system.

One or more interface buses 170 may also interface to the multiprocessor 110. Examples of interface buses can include industry standard architecture (ISA), peripheral component interconnect (PCI), PCi express (PCIe), accelerated graphics port (AGP), universal serial bus (USB), Advanced Technology Attachment (ATA), serial ATA (SATA), small computer system interface (SCSI), and other such buses and interfaces used in computers and embedded processor systems. The buses, or interface circuits associated with the buses, may incorporate one or more interrupt mechanisms for interrupting the multiprocessor 110. Analog interfaces 180 may connect to the multiprocessor 110. The analog interfaces 180 may include digital to analog converters, analog to digital converters, or both. The analog interfaces 180 may be used for video, audio, infrared, radar, or any other analog signal. The analog interfaces 180, or circuitry supporting the analog interfaces 180, may generate interrupts to the multiprocessor 110. One or more human machine interfaces 190 may connect to the multiprocessor 110. Human machine interfaces 190 may include video displays, keyboards, mice, light pens, projectors, speech recognition, switches, buttons, indicators, or any other mechanisms for receiving input from a human or providing output to a human. The human machine interfaces 190, or circuitry associated therewith, may provide interrupts to the multiprocessor 110.

Figure 2:
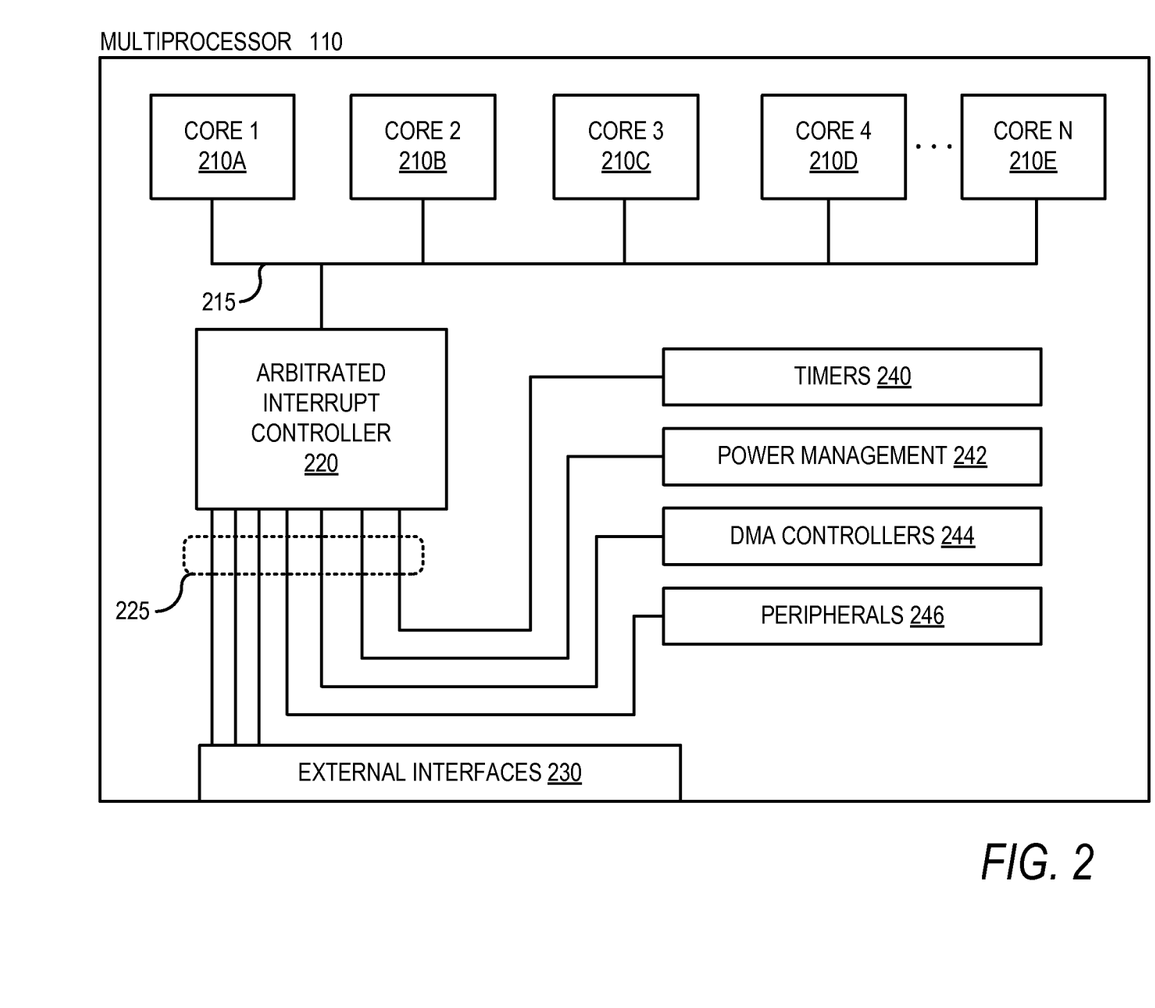
FIG. 2 is a block diagram illustrating a multi-core processor having an interrupt controller.

Turning now to FIG. 2, a block diagram illustrates a multicore processor having an interrupt controller according to embodiments presented herein. A multiprocessor 110 may have multiple internal processor cores such as core 1 through core N 210A-210E. These may be referred to collectively, or generally, as processor cores 210. Interrupts arriving to the multiprocessor 110 may come from external interfaces 230. Interrupts associated with the external interfaces 230 may originate from external devices as discussed with respect to FIG. 1. Similarly, devices internal to the multiprocessor 110 may generate interrupts. For example, timers 240, power management mechanisms 242, direct memory access (DMA) controllers 244, or other on-chip peripherals 246 may generate interrupts similar to interrupts originating from the external interfaces 230.

Various interrupt signals from internal devices and the external interfaces 230 may be carried individually on interrupt lines 225 to the arbitrated interrupt controller 220. Each of the interrupt lines 225 may be associated with a separate arbitrated interrupt handler 134 or an arbitrated interrupt handler 134 may be associated with more than one of the interrupt lines 225. The arbitrated interrupt controller 220 can interface with the processor cores 210 over an interrupt bus 215. The interrupt bus 215 can be a serial bus, a parallel bus, or any channel for communicating signals between the arbitrated interrupt controller 220 and the multiple processor cores 210. The interrupt bus 215 may be a general-purpose system bus, an input/output (I/O) bus, or a memory bus. The interrupt bus 215 may also be used for communicating signals between the arbitrated interrupt controller 220 and the multiple processor cores 210. The interrupt bus 215 can carry messages relating interrupt information between the arbitrated interrupt controller 220 and the processor cores 210. The messages communicated on the interrupt bus 215 can be encoded as signals, pulses, logic levels, packets, frames, or any other reasonable representation.

An interrupt can delay a currently executing process by preempting processor execution resources. Swapping from the current task to the interrupt handler 134 can occur by a context switch. A context switch may cause operations to complete out of order. A context switch may cause operations to be aborted and re-executed. A context switch may cause internal buffers be cleared, or caches to be altered. Cache lines and translation lookaside buffer (TLB) entries may be invalidated by the code or data from the arbitrated interrupt handler 134. Caches can maintain recently accessed data or code in a faster cache memory for rapid subsequent access. Thus, caching may be beneficial as the notions of repeated access and locality of reference imply that recently accessed memory locations, or those nearby, may be likely candidates for access again in the near future. Interrupt response latency and interrupt processing time may be delayed if code or data associated with the interrupt handler 134 are cached in a modified state on another processor core.

Disruptive effects may be increased in systems where interrupts are frequent; where interrupt service routines involve substantial amounts of code or data; or when a substantial amount of overall computing time is devoted to servicing interrupts. Such conditions can occur in either general-purpose or special-purpose computing systems where there are complex computing tasks involving large amounts of data tied to a real-time schedule. Similar conditions may appear in server computers that are processing large amounts of network traffic or storage system I/O operations. Embedding computing systems are special purpose computing systems embedded within devices or systems often supporting control and communications functions. For example, embedded processors may be applied to engine controllers, robotic controllers, communication devices, modems, mobile phones, remote controls, and a myriad of other applications known in the art. Embedding computing systems may perform much of their computing time responding to interrupts. Thus, the present disclosure recognizes that the efficiency of multiprocessor 110 operations within an embedded environment may benefit substantially from improved techniques for allocating resources to interrupts in an effective and efficient manner.

Figure 3:
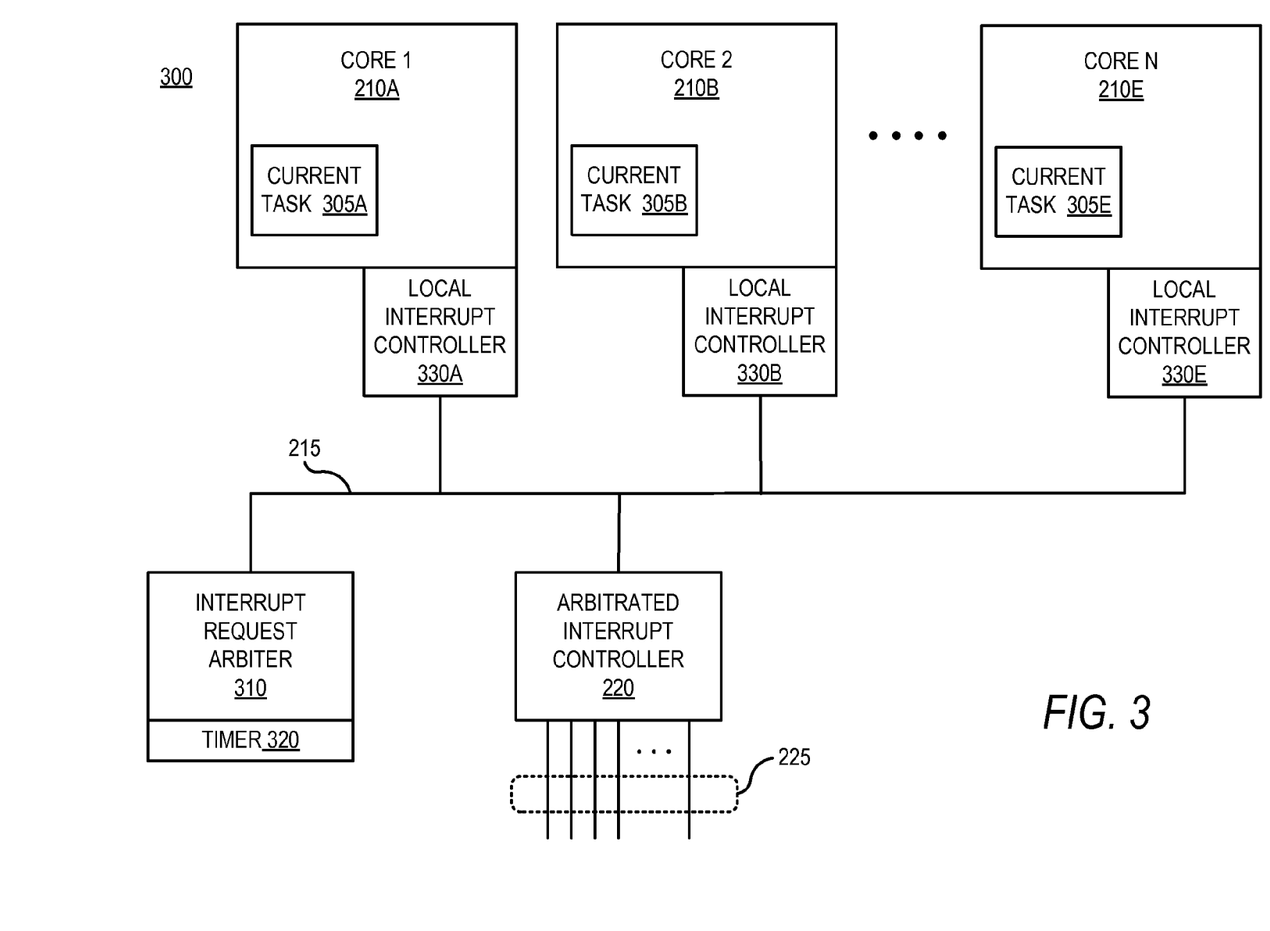
FIG. 3 is a block diagram illustrating an interrupt controller and an interrupt request arbiter within a multi-core processor.

Turning now to FIG. 3, a block diagram 300 illustrates an arbitrated interrupt controller 220 and an interrupt request arbiter 310 within a multi-core processor according to aspects of embodiments presented herein. An arbitrated interrupt controller 220 can be configured to receive and latch interrupt requests arriving on one or more interrupt lines 225. In response to an interrupt request event, the arbitrated interrupt controller 220 can be configured to identify which processor core 210 is to service the interrupt using the techniques disclosed herein.

Upon receiving an interrupt, the arbitrated interrupt controller 220 can determine a priority level for the interrupt handler 134 associated with the pending interrupt. The arbitrated interrupt controller 220 can determine the priority level from a data table in a memory or other circuitry. The arbitrated interrupt controller 220 may also determine a list of eligible processor cores for servicing the interrupt. The arbitrated interrupt controller 220 can form an interrupt message to announce the arrival of an interrupt and query information from the processor cores 210. The interrupt message may contain the priority level of the interrupt handler 134 along with the list of eligible processor cores. The interrupt message can be communicated from the arbitrated interrupt controller 220 to one or more processor cores 210 over an interrupt bus 215. In an instance where the interrupt message is communicated to all of the processor cores 210, the communication can be referred to as a broadcast on the interrupt bus 215. Alternatively, the arbitrated interrupt controller 220 may supply the interrupt message information to only the list of eligible processor cores 210.

Each processor core 210 can interface with the interrupt bus 215 by a local interrupt controller 330A-330E. The local interrupt controllers 330A-330E can be referred to collectively, or in general, as local interrupt controllers 330. When a message is sent onto the interrupt bus 215 for one or more of the processor cores 210, the message can be received at the local interrupt controller 330, which is associated with a respective one of the processor cores 210. For example, interrupt messages sent from the arbitrated interrupt controller 220 to one or more processor cores 210A-210E may be received and processed by one or more of the local interrupt controllers 330A-330E.

Each local interrupt controller 330 that receives an interrupt message can determine if it will request the assignment to execute the interrupt handler 134 associated with the pending interrupt on the processor core 210 associated with the local interrupt controller 330. The determination may be made by evaluating if the corresponding processor core 210 is on the list of eligible processor cores and also by examining a priority level of the current task at the processor core 210. A current task 305A-305E may be executing on each of the respective processor cores 210. The current tasks 305A-305E may be referred to collectively, or generally, as current tasks 305.

When a current task 305 associated with a processor core 210 has a lower priority level than the priority level associated with the interrupt handler 134, the processor core 210 may preempt, or interrupt, its current task 305 to service the interrupt. If this priority level condition is met in combination with the processor core 210 being on the list of eligible processor cores, the local interrupt controller 330 can request control of the interrupt on behalf of its associated processor core 210. The local interrupt controller 330 requesting control of the interrupt can send a core response message indicating such to the interrupt request arbiter 310. The core response message may be communicated over the interrupt bus 215. The core response message can indicate which interrupt request it is responding to and also supply the priority level of the current task 305 executing at the processor core 210. In some examples, a default priority level value can be used to indicate that the processor core 210 is idle. The described default priority level value, or idle value, may be the lowest possible priority level. When the criteria to service an interrupt are not met by a processor core 210, the local interrupt controller 330 may send a "reject" core response message to the interrupt request arbiter 310.

The interrupt request arbiter 310 can be configured to process the core response messages that it receives from the processor cores 210 and identify one processor core to be granted control of servicing the pending interrupt. In some examples, the interrupt request arbiter 310 can be configured to select the responding processor core that reports the lowest priority level, or idle, as the granted processor core for executing the arbitrated interrupt handler 134 to service the pending interrupt. In some other examples, the interrupt request arbiter 310 can be arranged to use a timeout period as determined by a timer 320 to establish a window for receiving core response messages from the processor cores 210. At the end of the timeout period, the interrupt request arbiter 310 can grant control of the interrupt to the requesting processor core that has the lowest priority level for its current task 305. In the case of a tie, in some examples, the first requesting processor can be granted, an arbitrary grant can be made, or secondary criteria can be evaluated. For example, the last processor core 210 to execute the particular arbitrated interrupt handler 134 may be granted. If all eligible processor cores 210 respond before the end of the timeout period, the interrupt request arbiter 310 may determine the interrupt grant immediately and not wait until the end of the timeout period.

Once the granted processor core 210 is determined, the interrupt request arbiter 310 can communicate an arbiter message over the interrupt bus 215 to the local interrupt controllers 330. The arbiter message can identify the processor core 210 to be granted responsibility for servicing the pending interrupt by executing the associated arbitrated interrupt hander 134. In some implementations, the arbiter message indicating the granted core can be sent as a broadcast to all local interrupt controllers 330. Such a grant to one processor core 210 can imply that all other processor cores 210 are denied the interrupt. Alternatively, the interrupt request arbiter 310 can communicate an arbiter message to each processor core 210 individually sending a "grant" message to one processor core 210 and "deny" messages to the other requesting processor cores 210. In this case, an arbiter message may be sent to each processor core 210, or only to each processor core 210 that requested the interrupt by issuing a core response message.

The described approach for allocating the interrupt to a processor core 210 can support servicing interrupts by a processor core 210 within an eligible set of processor cores 210. The processor core 210 servicing the interrupt may be selected such that a current task 305 of lowest priority level is disrupted or preempted by the arbitrated interrupt handler 134. This approach may reduce impact on overall system performance compared to allowing higher priority level tasks to be interrupted.

The arbitrated interrupt controller 220, interrupt request arbiter 310, and various local interrupt controllers 330 can be implemented as modules or circuits within the same integrated circuit supporting the processor cores 210. Such an integrated circuit may be referred to as a multiprocessor 110. In some other implementations, the arbitrated interrupt controller 220, interrupt request arbiter 310, and various local interrupt controllers 330 may be implemented as modules or circuits in a separate integrated circuit from the processor cores 210. The processor cores 210 may also be implemented as separate individual processors, or in some other examples the processor cores 210 may be implemented as an integrated circuit.

The integrated circuits discussed herein can be application specific integrated circuits (ASICs), programmable integrated circuits such as field programmable gate arrays (FPGA), systems on chip (SOC), system on substrate, system on package, or implemented in any other approach for integrating or packaging circuitry. While illustrated and discussed as separate modules or circuits, the arbitrated interrupt controller 220, interrupt request arbiter 310, and various local interrupt controllers 330 may be functionally combined in any combination or partitioned differently without departing from the spirit and scope of the technology disclosed herein. Together, the arbitrated interrupt controller 220, interrupt request arbiter 310, interrupt bus 215, various local interrupt controllers 330, in any combination, or any subset thereof may be referred to as an interrupt allocation system.

Figure 4:
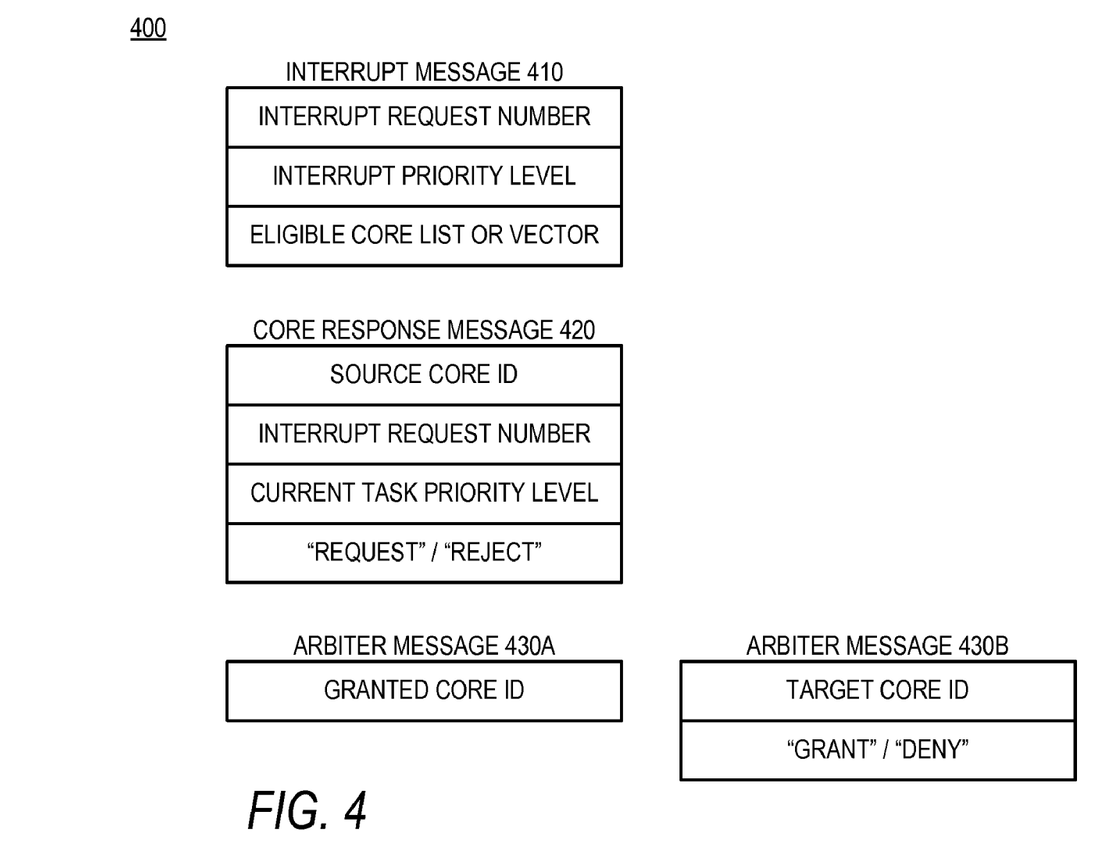
FIG. 4 is a data structure diagram illustrating interrupt bus messages.

Turning now to FIG. 4, a data structure diagram 400 illustrates interrupt bus 215 messages according to embodiments presented herein. An interrupt message 410 is an example of a message that may be transmitted from an arbitrated interrupt controller 220 over an interrupt bus 215 to multiple processor cores 210. The interrupt message 410 may be used to indicate that an interrupt has arrived from one of the interrupt lines 225 to the arbitrated interrupt controller 220. An example interrupt message 410 can include an identifier of the interrupt that has occurred, such as an interrupt request number or IRQ number. Another example interrupt message 410 can include the interrupt priority level. The interrupt priority level may be a priority level associated with the interrupt handler 134 for servicing the pending interrupt. A further example interrupt message 410 can indicate a list or vector of the eligible processor cores 210 for servicing the interrupt.

A core response message 420 may be issued from the local interrupt controllers 330 associated with multiple respective processor cores 210. The core response message 420 can be directed to the arbitrated interrupt controller 220 and the interrupt request arbiter 310. The core response message 420 can indicate that an individual processor core 210 accepts control of the pending interrupt by requesting assignment of the interrupt from the interrupt request arbiter 310. In some examples, the core response message 420 may include a source core ID identifying the specific processor core 210 from which the response originates. In some additional examples, the core response message 420 may indicate an identifier of the interrupt that is being responded to. For example, an interrupt request number or IRQ number may be indicated. Some example core response messages 420 can indicate a priority level of the current task 305 executing on the responding processor core 210. Further core response messages 420 may also indicate that the processor core 210 "requests" or "rejects" the pending interrupt.

An arbiter message 430A may be issued from the interrupt request arbiter 310 onto the interrupt bus 215 to indicate granting an interrupt to a particular processor core 210. For example, the arbiter message 430A may include the granted core ID indicating a particular processor core 210 that should execute the arbitrated interrupt handler 134 to respond to the pending interrupt. The arbiter message 430A may be broadcast to multiple processor cores 210 indicating to the processor cores 210 which core has been allocated the task to execute the arbitrated interrupt handler 134 associated with the pending interrupt. Alternatively, a second arbiter message 430B may be used to individually communicate granting of the arbitrated interrupt handler 134 to a particular processor core 210. The arbiter message 430B may include a target core ID for sending a particular arbiter message 430 along the interrupt bus 215 to the specified processor core 210. The arbiter message 430B may also include a "grant" or "deny" indicator to the particular processor core 210 identified by the target core ID. When using the second arbiter message 430B, the interrupt request arbiter 310 may send individual arbiter messages 430B to each processor core 210 or to each processor 210 on the eligible list of processor cores 210. Some example arbiter messages 430B may indicate a "deny" to each of the processor cores except for a single "grant" arbiter message 430B sent to the processor core 210 that has been assigned to execute the interrupt handler 134 for the pending interrupt.

The messages discussed with respect to FIG. 4 may be implemented as packets, signals, control lines, bus signals, or any other reasonable mechanism for signaling or communicating between the modules involved in assigning interrupts. These modules may include one or more of the arbitrated interrupt controller 220, interrupt request arbiter 310, various local interrupt controllers 330, and the interrupt bus 215 as discussed with respect to FIG. 3.

Figure 5:
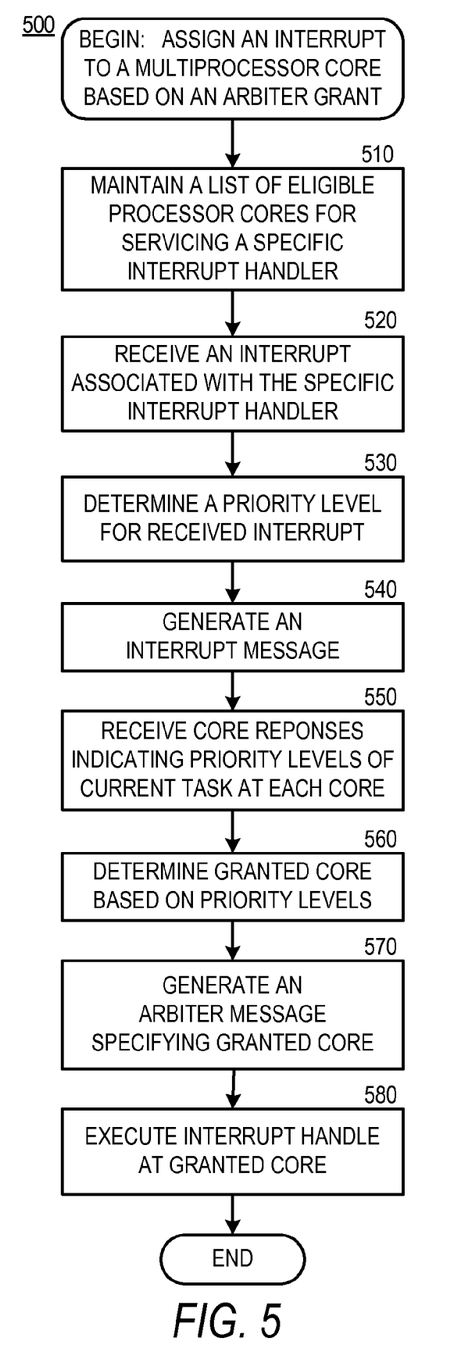
FIG. 5 is a flow diagram illustrating a process for assigning an interrupt to a multiprocessor core based on an arbiter grant.

Referring now to FIG. 5, additional details will be provided regarding the embodiments presented herein for allocation of interrupts within multiprocessors. In particular, FIG. 5 is a flow diagram illustrating aspects of a process 500 for assigning an interrupt to a multiprocessor core based on an arbiter grant according to aspects of embodiments presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The process 500 can begin at operation 510, where a list of eligible processor cores 210 can be maintained for servicing a specific arbitrated interrupt handler 134. The list of eligible processor cores 210 for servicing a specific arbitrated interrupt handler 134 may be pre-specified, allocated to distribute the interrupt handler 134 responsibilities across various processor cores 210, sequentially assigned, randomly assigned, assigned based on system architecture considerations, or assigned through any other initialization mechanism. The initialization may be specified by the operating system, by the BIOS, or by a configuration setting or circuit.

Next at operation 520, an interrupt associated with the specific interrupt handler 134 is received. The received interrupt can arrive on interrupt lines 225 to the arbitrated interrupt controller 220.

Continuing to operation 530, a priority level for the received interrupt can be determined. This determination may be based on the source of the interrupt or the particular interrupt line 225 that is involved in signaling the interrupt.

Proceeding to operation 540, an interrupt message 410 can be generated. The interrupt message 410 can be generated by the arbitrated interrupt controller 220 and transmitted on the interrupt bus 215. The interrupt message can indicate the interrupt priority level as determined in operation 530 and also the list of eligible core processors 210 as determined in operation 510.

Upon arrival of the interrupt messages 410 at the processor cores 210, each local interrupt controller 330 can evaluate if the respective processor core 210 is going to request the interrupt. This may be based on the interrupt having a higher priority than the current task 305 executing on the processor core 210. The local interrupt controller 330 can then generate a core response message 420 to be communicated onto the interrupt bus 215.

At operation 550, core response messages 420 may be received at the interrupt request arbiter 310 as well as at the arbitrated interrupt controller 220. Each core response message 420 can indicate the priority level of the current task 305 executing at the respective processor core 210.

At operation 560, the interrupt request arbiter 310 can determine a granted core for executing the arbitrated interrupt handler 134 associated with the pending interrupt. This determination can be made based on core responses 420 received at operation 550. The responding core processor 210 reporting the lowest priority level can be selected by the interrupt request arbiter 310 to service the pending interrupt.

At operation 570, an arbiter message 430A, 430B can be generated specifying the granted processor core 210. The arbiter message 430A, 430B can be communicated over the interrupt bus 215 to the local interrupt controllers 330 associated with the respective processor cores 210.

At operation 580, the granted processor core 210 can be triggered to execute the arbitrated interrupt handler 134 to service the pending interrupt. The granted processor core 210 can resume execution of its current task 305 once execution of the interrupt handler 134 is complete. The process 500 can terminate after operation 580.

Figure 6:
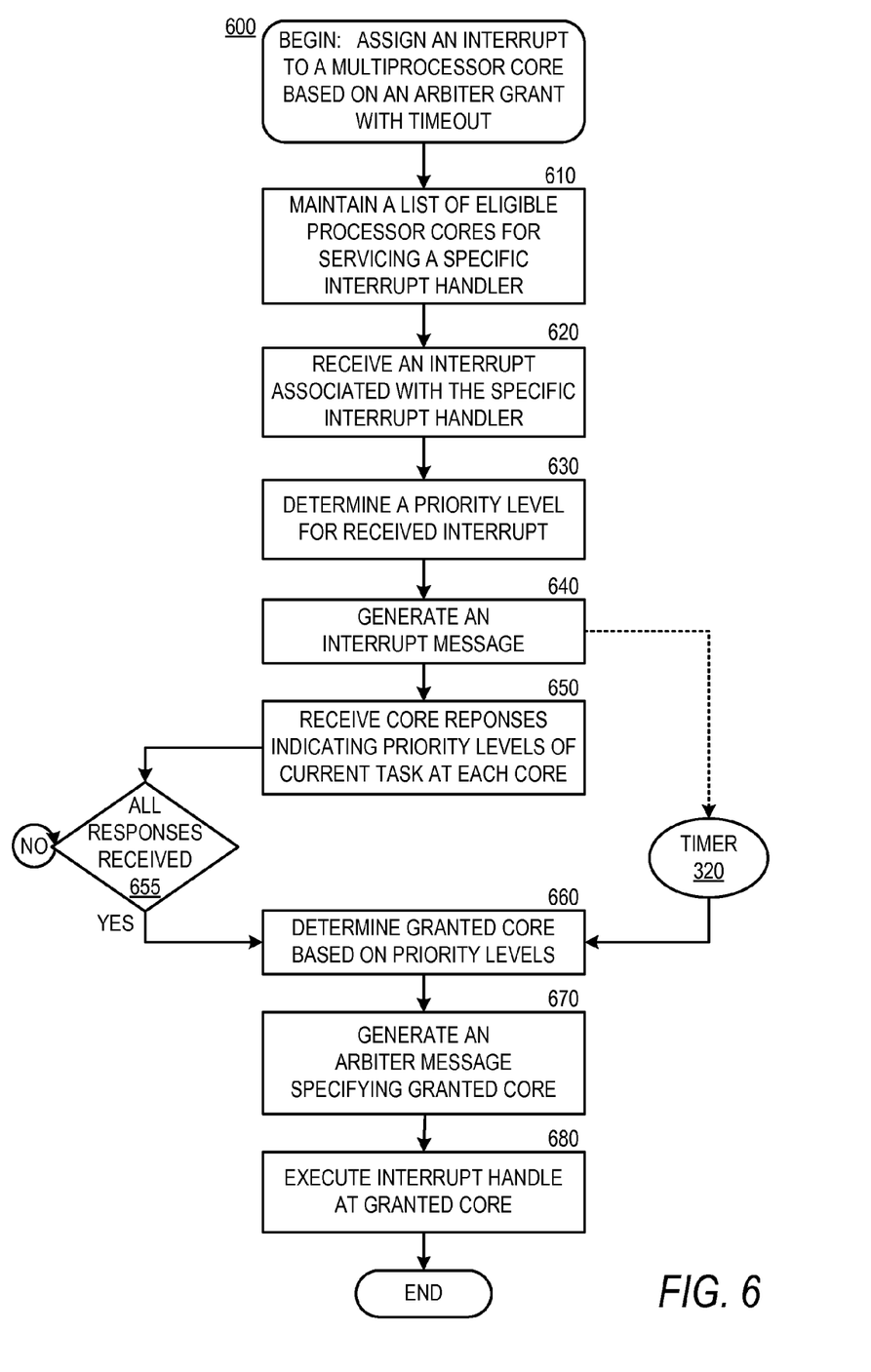
FIG. 6 is a flow diagram illustrating a process for assigning an interrupt to a multiprocessor core based on an arbiter grant with timeout, all arranged according to at least some of the embodiments presented herein.

Referring now to FIG. 6, additional details will be provided regarding the embodiments presented herein for the allocation of interrupts within multiprocessors. In particular, FIG. 6 is a flow diagram illustrating aspects of a process 600 for assigning an interrupt to a multiprocessor core based on an arbiter grant with timeout according to aspects of embodiments presented herein.

The process 600 begins at operation 610, where a list of eligible core processors 210 can be maintained for servicing a specific arbitrated interrupt handler 134. The list of eligible core processors 210 for servicing a specific arbitrated interrupt handler 134 may be pre-specified, allocated to distribute the arbitrated interrupt handler 134 responsibilities across various processor cores 210, sequentially assigned, randomly assigned, assigned based on system architecture considerations, or assigned through any other initialization mechanism. The initialization may be specified by the operating system, by the BIOS, or by a configuration setting or circuit.

Next at operation 620, an interrupt associated with the specific interrupt handler 134 is received. The received interrupt can arrive on interrupt lines 225 to the arbitrated interrupt controller 220.

Continuing to operation 630, a priority level for the received interrupt can be determined. This determination may be based on the source of the interrupt or the particular interrupt line 225 that is involved in signaling the interrupt.

At operation 640, an interrupt message 410 can be generated. The interrupt message 410 can be generated by the arbitrated interrupt controller 220 and transmitted on the interrupt bus 215. The interrupt message can indicate the interrupt priority level as determined in operation 630 and also the list of eligible core processors 210 as determined in operation 610. The generation of the interrupt message 410 and transmission onto the interrupt bus 215 can also trigger the start of a timer period associated with a timer 320.

Upon arrival of the interrupt messages 410 at the processor cores 210, each local interrupt controller 330 can evaluate if the respective processor core 210 is going to request the interrupt. This may be based on the interrupt having a higher priority than the current task 305 executing on the processor core 210. The local interrupt controller 330 can then generate a core response message 420 to be communicated onto the interrupt bus 215.

At operation 650, core response messages 420 may be received at the interrupt request arbiter 310 as well as at the arbitrated interrupt controller 220. Each core response message 420 can include the priority level of the current task 305 executing at the respective processor core 210.

Operation 655 can evaluate if all of the responses from the processor cores 210 have been received. If all of the core responses are detected by operation 655 prior to the timeout of the timer 320, the process 600 can continue to operation 660 without waiting for the remainder of the timeout period to expire. While not all of the responses have been detected, the process 600 can remain at operation 655. However, if the timeout period of the timer 320 expires prior to receiving all of the core responses, the process 600 can continue to operation 660 at that time using only the core responses that have been received to make the interrupt assignment.

At operation 660, the interrupt request arbiter 310 can determine a granted core for executing the arbitrated interrupt handler 134 associated with the pending interrupt. This determination can be made based on core responses 420 received at operation 650. The responding core processor 210 reporting the lowest priority level can be selected by the interrupt request arbiter 310 to service the pending interrupt.

At operation 670, an arbiter message 430A, 430B can be generated specifying the granted processor core 210. The arbiter message 430A, 430B can be communicated over the interrupt bus 215 to the local interrupt controllers 330 associated with the respective processor cores 210.

At operation 680, the granted processor core 210 can be triggered to execute the arbitrated interrupt handler 134 to service the pending interrupt. The granted processor core 210 can resume execution of its current task 305 once execution of the interrupt handler 134 is complete. The process 600 can terminate after operation 680.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A method for handling interrupts within a multiprocessor computing system having a plurality of processors, the method comprising:
   receiving an interrupt associated with an interrupt handler at the multiprocessor computing system;
   establishing a list of eligible processors for executing the interrupt handler, the list of eligible processors comprising a subset of the plurality of processors;
   transmitting an interrupt message to the subset of the plurality of processors, the interrupt message comprising an interrupt identifier of the interrupt and an interrupt priority level of the interrupt;
   upon transmitting the interrupt message to the subset of the plurality of processors, receiving core response messages from the subset of the plurality of processors, each of the core response messages comprising an identifier of one of the subset of the plurality of processors, the interrupt identifier of the interrupt, a current task priority level of the one of the subset of the plurality of processors, and a decision message, the decision message indicating whether the one of the subset of the plurality of processors accepts or rejects the interrupt based on a comparison between the current task priority level and the interrupt priority level;
   identifying a processor in the list of eligible processors by evaluating the core response messages, the processor associated with the decision message indicating accept and having a lowest current task priority level; and
   assigning the processor associated with the decision message indicating accept and having the lowest current task priority level to execute the interrupt handler.

2. The method of claim 1, wherein the decision message indicates that the one of the subset of the plurality of processors accepts the interrupt when the current task priority level is less than the interrupt priority level.

3. The method of claim 2, wherein the decision message indicates that the one of the subset of the plurality of processors rejects the interrupt when the current task priority level is greater than the interrupt priority level.

4. The method of claim 1, further comprising beginning a specified timeout period substantially coincident with transmitting the interrupt message to the subset of the plurality of processors.

5. The method of claim 4, wherein assigning the processor comprises evaluating processors responding prior to the end of the specified timeout period.

6. The method of claim 4, further comprising skipping a remaining portion of the timeout period in response to receiving responses from all queried processors.

7. The method of claim 1, further comprising preempting a current task at the assigned processor to execute the interrupt handler.

8. The method of claim 1, wherein assigning the processor associated with the decision message indicating accept and having the lowest current task priority level to execute the interrupt handler comprises transmitting an arbiter message to the subset of the plurality of processors, the arbiter message comprising the identifier of the processor associated with the decision message indicating accept and having the lowest current task priority level to execute the interrupt handler.

9. The method of claim 1, wherein assigning the processor associated with the decision message indicating accept and having the lowest current task priority level to execute the interrupt handler comprises transmitting arbiter messages to the subset of the plurality of processors, each of the arbiter messages comprising the identifier of the one of the subset of the plurality of processors and a second decision message, the second decision message indicating whether the one of the subset of the plurality of processors is assigned or denied to execute the interrupt handler.

10. A system for handling interrupts within a multiprocessor computing system having a plurality of processor cores, the system comprising:
  an interrupt line for requesting interrupt service from the multiprocessor computing system; and
  an interrupt allocation module configured to
    receive an interrupt associated with an interrupt handler at the multiprocessor computing system,
    establish a list of eligible processor cores for executing the interrupt handler, the eligible processor cores comprising a subset of the plurality of processor cores,
    transmit an interrupt message to the subset of the plurality of processor cores, the interrupt message comprising an interrupt identifier of the interrupt and an interrupt priority level of the interrupt;
    when the interrupt message is transmitted to the subset of the plurality of processor cores, receive core response messages from the subset of the plurality of processor cores, each of the core response messages comprising an identifier of one of the subset of the plurality of processor cores, the interrupt identifier of the interrupt, a current task priority level of the one of the subset of the plurality of processor cores, and a decision message, the decision message indicating whether the one of the subset of the plurality of processor cores accepts or rejects the interrupt based on a comparison between the current task priority level and the interrupt priority level;
    identify a processor core in the list of eligible processor cores by evaluating the core response messages, the processor core associated with the decision message indicating accept and having a lowest current task priority level; and
    assign the processor core associated with the decision message indicating accept and having the lowest current task priority level to execute the interrupt handler.

11. The system of claim 10, wherein the decision message indicates that the one of the subset of the plurality of processor cores accepts the interrupt when the current task priority level is less than the interrupt priority level.

12. The system of claim 11, wherein the decision message indicates that the one of the subset of the plurality of processor cores rejects the interrupt when the current task priority level is greater than the interrupt priority level.

13. The system of claim 10, wherein the interrupt allocation module is further configured to initiate a specified timeout interval substantially transmitting the interrupt message to the subset of the plurality of processor cores.

14. The system of claim 13, wherein to assign the processor core, the interrupt allocation module is further configured to evaluate processor cores responding prior to the end of the specified timeout interval.

15. The system of claim 13, wherein the interrupt allocation module is further configured to skip a remaining portion of the timeout interval in response to receiving responses from all queried processor cores.

16. The system of claim 10, wherein the interrupt allocation module is further configured to preempt a current task at the assigned processor core to execute the interrupt handler.

17. A device for handling interrupts within a multiprocessor computing system having a plurality of processors, the device configured to:
  receive an interrupt associated with an interrupt handler at the multiprocessor computing system;
  establish a list of eligible processors for executing the interrupt handler, the eligible processors comprising a subset of the plurality of processors;
  transmit an interrupt message to the subset of the plurality of processors, the interrupt message comprising an interrupt identifier of the interrupt and an interrupt priority level of the interrupt;
  when the interrupt message is transmitted to the subset of the plurality of processors, receive, within a specified timeout period, core response messages from the subset of the plurality of processors, each of the core response messages comprising an identifier of one of the subset of the plurality of processors, the interrupt identifier of the interrupt, a current task priority level of the one of the subset of the plurality of processors, and a decision message, the decision message indicating whether the one of the subset of the plurality of processors accepts or rejects the interrupt based on a comparison between the current task priority level and the interrupt priority level;
  identify a processor in the list of eligible processors by evaluating the core response messages, the processor associated with the decision message indicating accept and having a lowest current task priority level; and
  assign the processor associated with the decision message indicating accept and having the lowest current task priority level to execute the interrupt handler.

* * * * *

UNITED STATES PATENT AND TRADEMARK OFFICE
CERTIFICATE OF CORRECTION

PATENT NO. : 7,996,595 B2  
APPLICATION NO. : 12/423368  
DATED : August 9, 2011  
INVENTOR(S) : Wolfe It is certified that error appears in the above-identified patent and that said Letters Patent is hereby corrected as shown below:

On Title Page 2, Item (56), under "FOREIGN PATENT DOCUMENTS", Line 1, delete "EP   0 685 798  A2   12/1995".

On Title Page 2, Item (56), under "OTHER PUBLICATIONS", Line 13, delete "Part1," and insert -- Part 1, --, therefor.

In Fig. 5, Sheet 5 of 6, for Tag "550", in Line 1, delete "REPONSES" and insert -- RESPONSES --, therefor.

In Fig. 6, Sheet 6 of 6, for Tag "650", in Line 1, delete "REPONSES" and insert -- RESPONSES --, therefor.

In Column 3, Line 62, delete "PCi" and insert -- PCI --, therefor.

In Column 7, Line 34, delete "(FPGA)," and insert -- (FPGAs), --, therefor.

Signed and Sealed this  
Seventeenth Day of April, 2012

David J. Kappos  
*Director of the United States Patent and Trademark Office*